United States Patent [19]
Woerndle

[11] Patent Number: 4,715,589
[45] Date of Patent: Dec. 29, 1987

[54] CONNECTING DEVICE COMPRISING A BOLT AND A LOOP AROUND THE BOLT

[75] Inventor: Rudolf Woerndle, Brunnthal, Fed. Rep. of Germany

[73] Assignee: Messerschmitt-Boelkow-Blohm Gesellschaft mit beschraenkter Haftung, Munich, Fed. Rep. of Germany

[21] Appl. No.: 14,081

[22] Filed: Feb. 2, 1987

Related U.S. Application Data

[63] Continuation of Ser. No. 656,546, Oct. 1, 1984, abandoned.

[30] Foreign Application Priority Data

Oct. 25, 1983 [DE] Fed. Rep. of Germany ....... 3338654

[51] Int. Cl.⁴ .............................................. F16F 1/42

[52] U.S. Cl. .................................... 267/148; 293/121; 293/136; 403/291; 416/134 A

[58] Field of Search ..................... 74/470, 579 R, 581, 74/582; 248/317, 318, 339, 610, 620; 267/57, 57.1 A, 57.1 R, 63, 69, 73, 148, 149, 151; 403/220, 291; 416/131, 134 A, 230 A; 464/69, 85, 93, 94, 96, 903; 474/263, 267, 268, 269, 156; 293/120, 121, 133, 136

[56] References Cited

U.S. PATENT DOCUMENTS 1,962,585 6/1934 Roux ................................ 267/63 R
3,228,481 1/1966 Eldred ............................. 267/69 X
3,279,278 10/1966 Eldred .................................. 74/579
4,038,885 8/1977 Jonda .................................... 74/581
4,046,411 9/1977 Richard ............................... 293/136
4,255,087 3/1981 Wackerle et al. .......... 416/134 A X
4,293,276 10/1981 Brogdon et al. ............... 416/134 A
4,300,410 11/1981 Raghupathi et al. ............. 74/579 R
4,321,013 3/1982 Schwarz et al. ........... 416/134 A X
4,422,627 12/1983 Schmidt et al. ...................... 267/148
4,457,500 7/1984 Drachenberg et al. ............. 267/148
4,466,774 8/1984 Lycon et al. ................... 416/134 A
4,556,365 12/1985 Mouille et al. ................. 416/134 A

FOREIGN PATENT DOCUMENTS 71253 6/1979 Japan ............................... 74/579 R
97912 6/1982 Japan ............................... 74/579 R

*Primary Examiner*—Duane A. Reger
*Attorney, Agent, or Firm*—W. G. Fasse; D. H. Kane, Jr.

[57] ABSTRACT

A connecting device has at least one bolt and a loop of unidirectional fibers bound by or embedded in a synthetic matrix material looping around the bolt to form a looping range extending around the bolt. The resistance of the matrix material in the looping range against squeeze-out is improved by reinforcing fiber layers located in the looping range of the loop around the bolt. The fibers of these reinforcing layers are also bound by the matrix of the synthetic material. The reinforcing fibers form insert and/or cover layers having at least one main fiber orientation which extends at least approximately in the direction of the longitudinal bolt axis whereas the unidirectional fibers forming the loop extend approximately tangentially to the bolt in the looping range.

6 Claims, 1 Drawing Figure

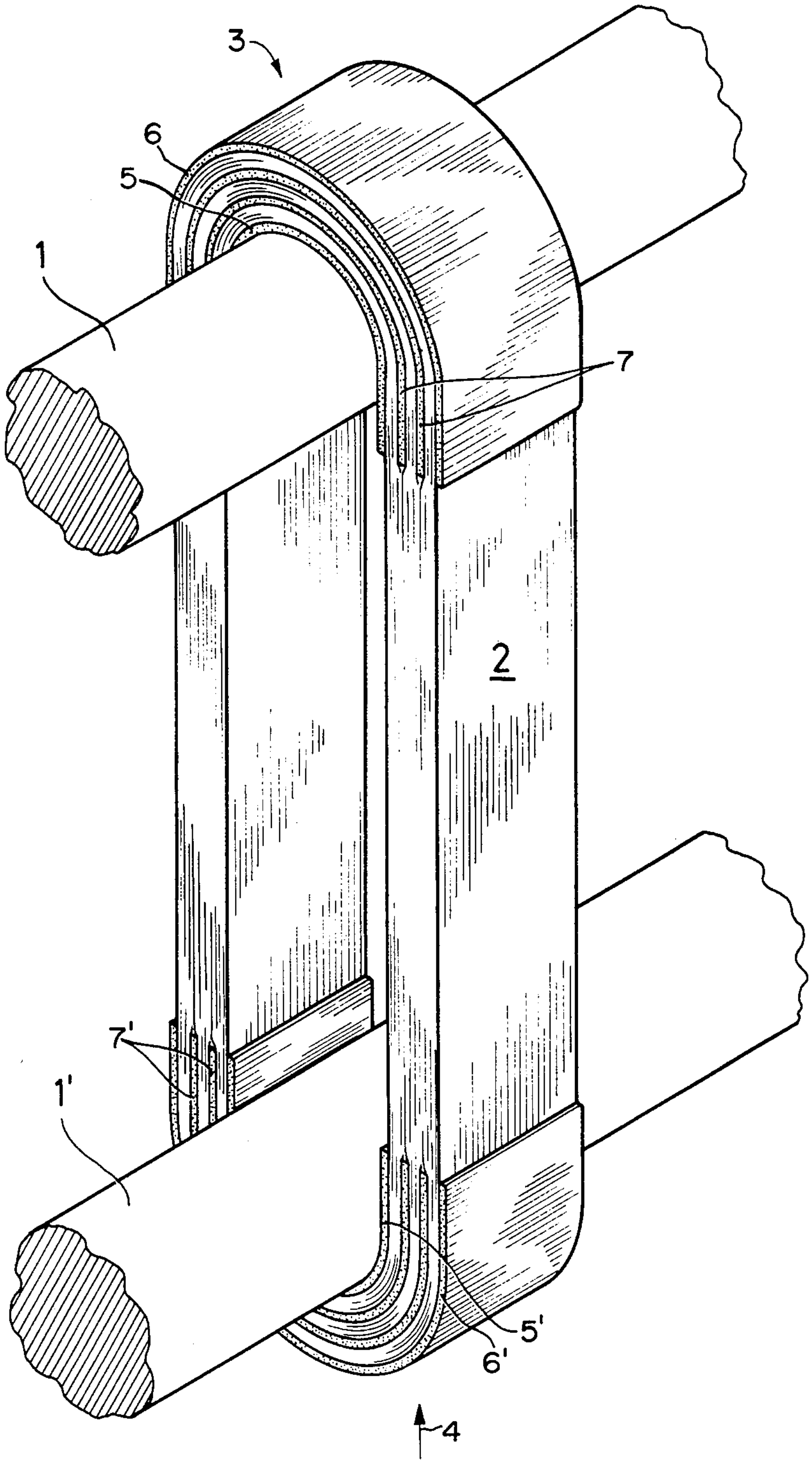
3
6
5
1
7
2
7'
1'
5'
6'
4

CONNECTING DEVICE COMPRISING A BOLT AND A LOOP AROUND THE BOLT

This application is a Continuation of application Ser. No. 656,546, filed Oct. 7, 1984, now abandoned.

FIELD OF THE INVENTION

The invention relates to a connecting device comprising a bolt and a loop around the bolt. The loop is made of unidirectional fiber strands or fiber rovings bound by or embedded in a synthetic material matrix.

DESCRIPTION OF THE PRIOR ART

Connecting devices of this type are subject to tension loads effective on the loop in the longitudinal direction of the loop. Under such load conditions, especially when the loop has a substantial thickness, there has been the danger heretofore that the loop breaks due to high radial compression loads effective on the loop material in the transition zone between the loop and the bolt. Such transition zone is also referred to as the looping range. The failure appears to be due to crosswise effective contractions of the synthetic material matrix caused by the compression loads, whereby the matrix material is squeezed out of the fiber compound material, in the axial direction of the bolt thereby resulting in the breaking of the matrix material. Such failure could be avoided by hardware enclosing the loop in the looping range or zone. However, it has been found that the increase in the load bearing capability achievable by such hardware enclosures of the looping range is insufficient for special applications in which these connecting devices are subject to high loads, for example, where equipment is to be suspended in connection with satellites.

OBJECTS OF THE INVENTION

In view of the above it is the aim of the invention to achieve the following objects singly or in combination:

to construct a connecting device as described above in such a manner that under all types of use failures as a result of an overload of the synthetic resin matrix are prevented;

to make sure that squeezing out of the synthetic resin matrix material due to a radial loop compression is avoided;

to avoid the use of metal hardware components; and to reduce or altogether prevent the contraction of the synthetic resin matrix material in the direction of the longitudinal extension of the bolt passing through each looping zone.

SUMMARY OF THE INVENTION

A connecting device of the type described above is characterized according to the invention in that fiber cover layers and/or fiber insert layers are located in the looping zone of the loop and these layers are also bound by the synthetic material matrix, e.g. resin. These reinforcing layers have at least one main fiber orientation extending at least approximately in the longitudinal direction of the respective bolt. The fibers forming the loop proper on the other hand extend unidirectionally and approximately tangentially relative to the bolt.

This structure or arrangement of the fibers in the looping range of the loop prevents or at least impedes the contraction of the synthetic material matrix in the direction of the longitudinal bolt extension, whereby the strength of the loop in the looping zone around the bolt is substantially increased in the longitudinal bolt direction.

It has been found that by these features a substantial increase of the dynamic load bearing capability of the loop can be achieved even if the fiber orientation in the reinforcing layers is not completely parallel to the longitudinal axis of the bolt. For example, tests have shown that even where the reinforcing fibers extend at an angle relative to the longitudinal direction of the bolt axis, the dynamic load bearing capability of the loop can be increased a thousand fold.

BRIEF DESCRIPTION OF THE DRAWING

In order that the invention may be clearly understood, it will now be described, by way of example, with reference to the single figure which shows a perspective view of a connecting device according to the invention.

DETAILED DESCRIPTION OF A PREFERRED EXAMPLE EMBODIMENT AND OF THE BEST MODE OF THE INVENTION

The connecting device comprises two bolts 1 and 1' as well as a loop 2 having at least two loop legs interconnected by at least one looping bight 3 or 4 or by two looping bights 3 and 4 around the respective bolt 1, 1'. The fibers in the loop 2 extend approximately unidirectionally and tangentially relative to the bolts. The loops 2 comprise fiber strands or fiber rovings, for example, made of glass, carbon or the like embedded in or bound together by a matrix of synthetic resin or the like. The loop legs and the looping bight or bights define a laterally open space through which the bolts 1, 1' pass.

Primarily the loop 2 is exposed to tension loads as the two bolts 1, 1' tend to move away from each other. However, in the looping zones or ranges 3 and 4, the loop 2 is also exposed in high radial compression loads where the looping portions in the looping zones press against the respective bolt. These compression loads cause the above mentioned contraction which squeezes out the matrix material laterally.

To avoid this problem the invention provides reinforcing layers of fibers which are also bound by the matrix material, but the fibers of which have at least one main fiber orientation extending at least approximately in the longitudinal direction of the respective bolt. Several such reinforcing layers may be located as shown in the drawing. For example, an inner cover layer 5, 5' is interposed between each bolt and the inner surface of the looping zone. Further, an outer cover layer 6, 6' is arranged around the respective looping zone. One or several internal insert layers 7, 7' may be provided. In all these layers the fiber orientation should preferably be predominantly in parallel to the longitudinal extension of the bolts 1, 1'.

The fiber layers 5, 6 and 7 as well as 5', 6', 7' may be made of fiber webbings or fiber layered structures or the like with a 0/90° fiber orientation, whereby, however, only the fibers in one direction referred to as the main direction, are effective for the present purposes. It has been found that even where a ±45° fiber orientation is used in the reinforcing layers, relative to the longitudinal axis of the bolt, the present purposes can also be well served. The use of isotropic fiber material is also suitable for the present purposes.

Although the invention has been described with reference to specific example embodiment, it will be appreciated, that it is intended to cover all modifications and equivalents within the scope of the appended claims.

What is claimed is:

1. A connecting device, comprising bolt means and a loop having two loop legs and at least one looping bight connected to said loop legs, said bight looping around the bolts means, said loop legs and loop bight forming a laterally open space, said loop including a matrix of synthetic material and unidirectional fibers embedded in said matrix of synthetic material, said looping bight further including reinforcing fiber layer means directly embedded in said matrix of synthetic material, said reinforcing fiber layer means being located exclusively in a looping range formed by said looping bight around said bolt means so that said loop legs are free of said reinforcing fiber layer means, said unidirectional fibers of said loop having a fiber orientation extending substantially tangentially relative to and around said bolt means in said loop bight, said reinforcing fiber layer means having at least one main fiber orientation extending at least approximately in a longitudinal direction of said bolt means in said loop bight so that the fibers in said reinforcing fiber layer means extend mainly about coaxially with the respective bolt means for increasing the resistance of said matrix of synthetic material against contractions in said looping range around said bolt means and for preventing a squeeze-out of matrix material out of said loop bight when said loop legs are pulled so as to press said bight against said bolt means.

2. The connecting device of claim 1, wherein said at least one main fiber orientation of said reinforcing fiber layer means extends approximately in parallel to said longitudinal direction of said bolt means.

3. The connecting device of claim 1, wherein said at least one main fiber orientation of said reinforcing fiber layer means extends approximately at an angle of ±45° relative to said longitudinal direction of said bolt means.

4. The connecting device of claim 1, wherein said reinforcing fiber layer means comprise at least one intermediate insert layer inserted into said unidirectional fibers of said loop in said looping range.

5. The connecting device of claim 1, wherein said reinforcing fiber layer means comprise at least one cover layer covering said unidirectional fibers of said loop in said looping range.

6. The connecting device of claim 1, wherein said reinforcing fiber layer means comprise at least one reinforcing fiber layer forming an intermediate insert layer inserted into said unidirectional fibers of said loop in said looping bight around said bolt means, at least one inner cover layer located in said looping bight directly in contact with said bolt means and between said bolts means and said loop, and at least one outer cover layer around said loop in said looping bight.

* * * * *